United States Patent [19]
La Clair et al.

[11] 3,876,946
[45] Apr. 8, 1975

[54] RADIO FREQUENCY DIGITAL FOURIER ANALYZER

[75] Inventors: Philip W. La Clair, Santa Monica; John P. McCarthy, Los Angeles; Gunther W. Sorger, Menlo Park, all of Calif.

[73] Assignee: The Singer Company, New York, N.Y.

[22] Filed: Oct. 31, 1973

[21] Appl. No.: 411,502

[52] U.S. Cl............. 325/363; 235/152; 324/77 CS; 325/67
[51] Int. Cl............................................ H04b 1/16
[58] Field of Search............ 325/363, 67; 324/77 C, 324/77 CS; 235/152

[56] References Cited
UNITED STATES PATENTS

| | | | |
|---|---|---|---|
| 3,467,859 | 9/1969 | Nixon et al. | 325/77 C X |
| 3,573,626 | 4/1971 | Eitman | 325/363 X |
| 3,641,515 | 2/1972 | Sves | 325/77 C X |

*Primary Examiner*—Malcolm A. Morrison
*Assistant Examiner*—David H. Malzahn
*Attorney, Agent, or Firm*—Edward L. Bell; Joseph R. Dwyer; Linval B. Castle

[57] ABSTRACT

A radio frequency digital Fourier analyzer is provided which serves not only as a spectrum analyzer, but as an important statistical tool. The digital Fourier analyzer comprises a two-channel receiver which is interfaced with a digital computer through an analog/digital converter, and which also includes appropriate control, peripheral and read-out equipment. The receiver comprises a two-channel radio frequency/intermediate frequency converter, and it can operate as an analog spectrum anaylzer or network analyzer. The receiver responds to radio frequency signals in a frequency range of, for example, 500 KHz to 1,300 MHz. The receiver converts a radio frequency signal which is to be analyzed into a band-limited intermediate frequency signal of the proper frequency for digital conversion. The analog/digital converter converts the intermediate frequency signal from the receiver into digital data for the computer. The computer calculates the fast Fourier transform (FFT) of the sampled data and uses the result to calculate one or more desired functions. The read-out equipment displays and/or records the results of the computation.

4 Claims, 4 Drawing Figures

RADIO FREQUENCY DIGITAL FOURIER ANALYZER

BACKGROUND OF THE INVENTION

Complex functions of time may be transformed by the Fourier transformation into sums of simple, sinusoidal functions at different frequencies. For example, to determine the response of a certain system to a complex input signal, the input signal may be broken down into a sum of sinusoidal elements, and the system response to each sinusoidal element may be analyzed. This technique is referred to as analysis in the "frequency domain" and is probably the most widely known and used design and analysis procedure for all types of electrical engineering problems.

The Fourier transformation is the mathematical tool which permits translation between the time domain in which all physical processes occur and the frequency domain in which the aforesaid analysis is possible. Until recently the use of the Fourier analysis for the numerical solution of practical problems was impractical because of the enormity of the required numerical calculations. However, in 1965 Cooley and Tukey described an algorithm which reduced the number of arithmetic operations in the calculation of a Fourier transform by literally orders of magnitude, making direct numerical calculation a feasible procedure. Since 1965, the year of the Cooley-Tukey algorithm, Fourier analyses have been carried out more and more by digital techniques. The Cooley-Tukey algorithm is usually referred to as the "Fast Fourier Transform (FFT)," and it reduces the lengthy and cumbersome calculations of the Fourier coefficients by a digital computer to a manageable and relatively rapid procedure.

When a waveform is sampled and analyzed in a digital computer by use of the Cooley-Tukey algorithm, a finite, discrete version of the Fourier transform (DFT) is used. Although most of the properties of the continuous Fourier transform (CFT) are retained, several differences result from the constraint that the discrete Fourier transform must operate on sampled waveforms defined over finite intervals.

The fast Fourier transform from the Cooley-Tukey algorithm is simply an efficient method for computing the discrete Fourier transform, and the fast Fourier transform can abe used in place of the continuous Fourier transform, only to the extent that the discrete Fourier transform could before, but with a substantial reduction in computer time.

The Fourier transform pair for continuous signals can be written in the form:

$$X(f) = \int_{-\infty}^{\infty} x(t)e^{-i2\pi ft} dt \quad \ldots \quad (1)$$

$$x(t) = \int_{-\infty}^{\infty} X(f)e^{i2\pi ft} df \quad \ldots \quad (2)$$

for $-\infty < f < \infty, -\infty < t < \infty,$ and $i = \sqrt{-1}.$ The uppercase $X(f)$ represents the frequency-domain function; the lowercase $x(t)$ is the time-domain function.

The analogous discrete Fourier transform pair that applies to sampled versions of these functions can be written in the form:

$$X(j) = \frac{1}{N} \sum_{k=0}^{N-1} x(k)e^{-i2\pi jk/N} \quad \ldots \quad (3)$$

$$x(k) = \sum_{j=0}^{N-1} X(j)e^{i2\pi jk/N} \quad \ldots \quad (4)$$

for $j = 0, 1, \ldots, N-1; k = 0, 1, \ldots, N-1.$ Both $X(j)$ and $x(k)$ are, in general, complex series.

When the expression $e^{2\pi i/N}$ is replaced by the term $W_N$, the DFT transform pair takes the form:

$$X(j) = \frac{1}{N} \sum_{k=0}^{N-1} x(k)W_N^{-jk} \quad \ldots \quad (5)$$

$$x(k) = \sum_{j=0}^{N-1} X(j)W_N^{+jk} \quad \ldots \quad (6)$$

As described above, a discrete finite transform (DFT) must be used whenever a Fourier transform is computed digitally. The discrete finite transform is more like a Fourier series than a transform, since it assumes that the input is periodic in the interval T and has a spectral resolution of:

$$\Delta f = 1/T. \quad (7)$$

The DFT is written as:

$$S_x(m\Delta f) = \frac{1}{N} \sum_{n=0}^{N-1} x(n\Delta t) \exp\left\{-\Delta t \frac{2\pi}{N} mn\right\} \quad (8)$$

where: $\Delta t$ = Sample Period

To obtain a constant linear spectrum independent of time position it is at least necessary to convert the real and imaginary components of the spectrum into magnitude and phase. While the linear magnitude spectrum is a valid approach to achieve a useful spectrum, it is cumbersome from a computational standpoint. A closely related function, the "auto power spectrum" gives the same basic information, and it is faster to compute and can be applied to measurements beyond the capability of the linear magnitude spectrum. The auto spectrum $G_{xx(f)}$ is formed by multiplying $$G_{xx(f)} = S_{x(f)} \cdot S_x^*(f) = [A(f) + iB(f)][A(f) - iB(f)] \quad (9)$$

$$G_{xx(f)} = A^2(f) + B^2(f) \quad (10)$$

Each spectral line of $G_{xx(f)}$ is proportional to the voltage squared at frequency $f$, or more exactly to the variance of the input waveform at frequency $f$. The auto spectrum is useful because it is the magnitude squared of the linear spectrum. For this reason, and because it has no imaginary part, it is independent of the time position of the input waveform. It is the squarelaw auto spectrum that is usually implied when the term "spectral analysis" is used.

The dual channel feature of the digital analyzer of the present invention makes it possible to take measurements from two signals simultaneously, so that the relationship between the two signals may be determined. There are two distinct quantities that can be measured with respect to the two signals. The first quantity is the degree to which one signal depends on the other. For example, the relationship between an input $x(t)$ and an output $z(t)$ might be of interest. There are two distinct quantities that can be measured in such a situation. The first is the degree to which the output depends on the input. That is, is $z(t)$ caused by $x(t)$, or is $z(t)$ due in part to some unrelated signal such as $n(t)$. The second is, if $z(t)$ is caused at least partially by $x(t)$, what is the form of this relationship.

It is important to note that although neither casualty nor relationship can exist without the other, each contains different information about the process, and it should also be noted that no single measurement of the correlation between two signals, either in the time domain or the frequency domain, is capable of separating these two quantities.

One of the basic Fourier functions, namely the "cross spectrum" function, illustrates these points. The cross spectrum $G_{yx(f)}$ between the two signals $y(t)$ and $x(t)$ in a process or system is formed by multiplying the linear spectrum of $y(t)$ by the complex conjugate of the linear spectrum of $x(t)$ measured at the same time, as will be discussed in more detail subsequently. While the "cross spectrum" function does not give a definite measurement, it leads to two measurements which not only separate relationship and causality, but also give quantitative results.

The first result is the basic transfer function which is the ratio of the output linear spectrum for zero noise to the input linear spectrum. The major error in transfer function measurement develops when the output $z(t)$ is not totally caused by the input $x(t)$ but is contaminated by internal system noise $n(t)$. To measure the coherence between $x(t)$ and $z(t)$ it is necessary to compute a new quantity, known as the "coherence" function. The foregoing functions are functions of frequency. However, there are also functions of time which can be used in some of the same ways as spectra to clarify the linear processes. These are "correlation" functions.

Digital Fourier analyzers using the Cooley-Tukey algorithm or fast Fourier transform (FFT) are known to the prior art. The prior art digital Fourier analyzers usually comprise an analog/digital converter which converts the input to be analyzed into digital signals, and a general purpose computer which makes the necessary computations on the digital signals. The basic operations performed by the prior art Fourier analyzer include the four basic functions described above, namely, the "transfer" function, the "coherence" function, the "correlation" function and the "cross spectrum" function. However, there are many combinations of the fundamental measurements which the computer is capable of providing, depending on the actual application.

A. Transfer function

This is one of the most important quantities which the Digital Fourier Analyzer can measure. The transfer function $H(f)$ of a linear system is the complex ratio of the output spectrum to the input spectrum. The input signal consists of a pure sine wave, then one point (corresponding to the frequency of the sine wave) on the transfer function relationship may be measured. For example, if the input signal $x(t)$ is represented by $$x(f_o, t) = x_o \sin 2\pi f_o t \quad (11)$$

and the output signal $y(t)$ is also a pure sine wave $$y(f_o, t) = y_o \sin(2\pi f_o t + \phi) \quad (12)$$

The ratio of output to input then yields the value of transfer function to the linear system at the particular frequency $f_o$. Thus:

$$H(f_o) = y(f_o, t)/x(f_o, t)$$
$$= y_o/x_o (\cos \phi + i \sin \phi) \quad (13)$$

Expressed in polar from the magnitude of $H(f_o)$ is $$|H(f_o)| = y_o/x_o \quad (14)$$

and the phase angle is the angle $\phi$.

If the input frequency is varied with time (linear sweep for instance), the gain and the phase shift are then measured as a function of frequency such as in a swept-frequency network analyzer.

In nearly every electronic processing system, especially in communication systems, the input signal does not consist of a pure sine wave signal alone but of a composite time function $x(t)$ which contains many frequencies (for instance the multi-channel signal in a coaxial L-4 transmission line of the telephone company). If one could perform a Fourier transform on the input function $$x(t) \rightarrow Sx(f)$$

and measure the output function y(t) and perform a Fourier transform on it:

$$y(t) \rightarrow Sy(f)$$

the transfer function $$H(f) = Sy(f)/Sx(f)$$

can be calculated. The importance of this measurement technique is not only the ability to measure the transfer function with many frequencies present at the input simultaneously but that the transfer function can be measured using the actual signals which propagate through the system under operating conditions. That means that no pilot frequency or test signals are necessary, nor that the system has to be turned off for the regular traffic.

The transfer function $H(f)$ is obtained by measuring the cross spectrum $Gyx$ and the input auto spectrum $Gxx$ and dividing them. This can be proven in the following way:

The cross spectrum is defined as the product of the linear spectrum of the output signal $y(t)$ which we call $Sy$, and the complex conjugate of the spectrum of the input signal $x(t)$ which we call $S_x^*$ $$Gyx = S_y S_x^*$$

The measurement of the cross spectrum consists, therefore, of the simultaneous processing of $x(t)$ and $y(t)$ (converting each of the 2.7 MHz IF frequency, sampling it, converting all samples to digital words, and storing all words in the computer); then the calculation of the Fourier transformer of each $Sx$, and $Sy$, the calculation of the complex conjugate of $Sx$ $Sx^*$, and the multiplication of $Sy$ and $Sx^*$. $Gyx$ is a complex expression since $$Gyx = Sy\, Sx^* = (Ay + jBy)(Ax - jBx).$$

Since $H(f)$ is defined as $$H(f) = Sy/Sx$$

we can say $$H(f) = Sy\, Sx^*/Sx\, Sx^*$$

as shown $Sy Sx^*$ is the cross spectrum and $Sx Sx^*$ is the auto spectrum. Alternately, the Fourier transform of the output signal $Sy$ and that of the input signal $Sx$ are calculated and divided:

$$H(f) = Sy/Sx$$

although the former method is sometimes preferred from the standpoint of ease and accuracy of computation on the computer.

B. Coherence function using the actual signals in a system

The coherence function is the average value of the ratio between the square of the average of the amount of the cross spectrum between the input and output of a transmission system, and the product of the average of the auto spectrum of the input signal with the average of the auto spectrum of the output signal:

$$\overline{\gamma 2} = \overline{Gyx}\ \overline{Gyx^*}/\overline{Gyy}\ \overline{Gxx} = |\overline{Gyx}|^2/\overline{Gyy}\ \overline{Gxx}$$

If the system is noise free, this quantity becomes one, indicating complete coherence between output and input. This can be shown by expressing the cross and auto spectra in Fourier transforms:

$$\overline{Gyx} = \overline{Sy\, Sx^*}$$

as shown before $$\overline{Gxx} = \overline{Sx Sx^*}$$
$$\overline{Gyy} = \overline{Sy\, Sy^*}$$

Since $$\overline{Gyx^*} = \overline{Sy^*\, Sx}$$

$$\overline{\gamma 2} = \overline{Sy\, Sx^*}\ \overline{Sy^*\, Sx}/\overline{Sx\, Sx^*}\ \overline{Sy\, Sy^*} = 1$$

If there is noise in the system (either white noise, nonlinearity, impulse noise, incoherent leakage signals of hum, etc.), then the coherence starts to disappear; therefore, the value of $\overline{\gamma 2}$ is a measure of the signal-to-noise ratio in a system under actual conditions, again an important quantity in multi-channel or broadband composite signal communications system. This can be shown as follows: If there is noise introduced in a system, the output function is $$yn(t) = y(t) + n(t)$$

and the output auto spectrum will be:

$$Gy_n\, y_n = (Sy + Sn)(Sy + Sn)*$$
$$= Sy\, Sy^* + Sy\, Sn^* + Sn\, Sy^* + Sn\, Sn^*$$

If this output auto spectrum is averaged over several measurements, the cross products disappear since they are products of non-coherent signals:

$$\overline{Gyn\, yn} = \overline{Sy\, Sy^*} + \overline{Sn\, Sn^*} = \overline{Gyy} + \overline{Gnn}$$

The cross spectrum between input and output contains in each measurement the contribution from the noise. However, as shown before, if several measurements are averaged, the non-coherent products will disappear and the final average will be equal or close to the cross product between the noise free output spectrum and the input spectrum. Then $$\overline{\gamma 2} = \overline{Gyx}^2/\overline{Gyn\, yn}\ \overline{Gxx}$$

It will be shown here, that this coherence function has a number between zero and one depending on the signal-to-noise ratio of the output signal.

We can say (independent whether noise is in the system or not)

$$|\overline{Gyx}|^2 = \overline{Gyx}\ \overline{Gyx^*}$$

and since:

$$\overline{Gyx} = \overline{Sy\, Sx^*} \text{ and } \overline{Gyx^*} = \overline{Sy^*\, Sx}$$

then:

$$\overline{Gyx\, Gyx^*} = \overline{Sy\, Sy^*\, Sx\, Sx^*}$$
$$= \overline{Gyy\, Gxx}$$

Then:

$$\gamma 2 = \overline{Gyy}\ \overline{Gxx}/\overline{Gynyn}\ \overline{Gxx} = \overline{Gyy}/\overline{Gyy} + \overline{Gnn}$$

As said before, this quantity can be determined between actual input and output functions with the actual noise in the system by calculating several cross spectra, averaging them, and calculating several auto spectra of the input and output function. The coherence functions obtained this way can then be related to the intelligence of the output signal such as a video signal, a radar signal, a telephone signal, the error rate, measurements using noise loading techniques, impulse noise measurements, etc., to come up with a relationship between all these quantities. The coherence function measurement can then be used to determine the noise contamination of the system using the actual signal stream, a measurement which presently to our knowledge cannot be made at high frequencies. At present, test signals have to be inserted into the system under test, which might create a different operating condition and actually yield wrong results.

C. Correlation function between the output signal and the input signal

The correlation function is defined as:

$$Ryx\ (\tau) = \frac{1}{T} \int_0^T x(t)\ y\ (t-\tau)\ dt$$

The correlation function is equivalent to the inverse Fourier transform of the cross spectrum of $y(t)$ and $x(t)$, $Gyx$. Although the correlation function can be computed directly from the sampled time functions, it is frequency more economical from a computational standpoint to perform the calculation by connecting the two signals $x(t)$ and $y(t)$ from the RF frequency region to the IF and sampling the signals as explained previously. The Fourier transforms of $x(t)$ and $y(t)$ are calculated and the cross spectrum $Gyx$ is determined. The correlation function is calculated by taking the inverse Fourier transform of $Gyx$.

The resulting correlation function will peak when the two functions $y(t)$ and $x(t)$ are displaced by a time equal to the propagation delay between $x(t)$ and $y(t)$. Therefore, the correlation function will measure the group delay between an arbitrary input signal and its subsequent output signal, in other words the group delay between output and input using the actual signals in the system.

D. Cross spectrum or cross power spectrum

This is the fundamental quantity for transfer function and coherent function measurements. However, many times the user is interested in the cross spectrum alone.

The transfer function described above may be used, for example, to determine the gain, loss or phase shift of a linear system such as a transmission system under actual operating conditions. The coherence function may be used, for example, to determine signal contamination by noise, also measured under actual operating conditions. The correlation function may be used to determine the group delay in a linear system such as a transmission system measured with actual signals. The transfer function may also be used, for example, to measure unbalances in a balanced transmission system, or balanced network, under actual operating conditions. The foregoing are merely typical examples of the manner in which the four basic functions described above may be used in actual practice.

The transfer function, the power spectrum, the coherence function, the cross power spectrum, the correlation function, and combinations of such fundamental measurements can be used generally in voice, audio and data communication in, for example, coaxial lines up to 90 MHz; for the calibration of such coaxial lines; for a more precise determination of propagation characteristics in air, space, waveguide, coaxial lines and the like; for input and output impedance measurements in transmission systems, for balance measurements, for cross-talk measurements, for frequency translation error measurements, and so on.

DETAILED DESCRIPTION OF THE ILLUSTRATED EMBODIMENT

The radio frequency digital Fourier analyzer of the invention can be considered in two separate sections, that is, the radio frequency/intermediate frequency converter section and the digital section. The radio frequency/intermediate frequency converter section comprises amplifiers, oscillators, heterodyne mixers, and other components required to convert the radio frequency signal to be analyzed into a band-limited intermediate frequency signal of appropriate frequency for digital conversion. The digital section includes an appropriate analog/digital converter, a master clock system, a digital computer, and appropriate peripheral equipment.

Figure 1:
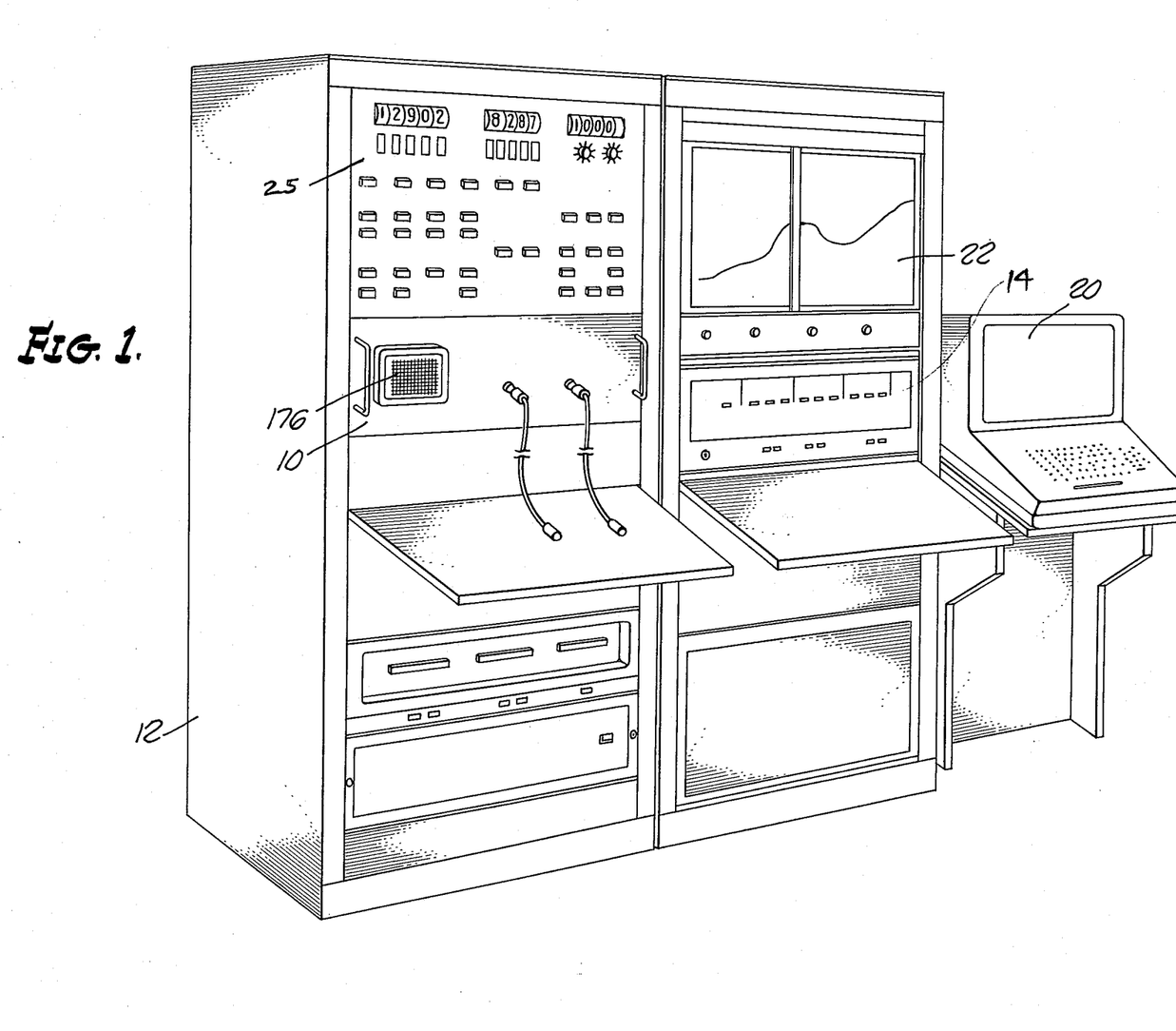
FIG. 1 is a perspective representation of apparatus incorporating the system and concepts of the invention.

In a constructed embodiment, the radio frequency/intermediate frequency converter section includes a dual channel radio frequency/intermediate frequency converter which is capable of operating at a radio frequency spectrum analyzer and radio frequency network analyzer, converting a range of from 500 KHz to 1,300 MHz, and that section is represented by a unit 10 mounted in a housing 12 of FIG. 1. An appropriate unit for this purpose, for example, is the Singer Company spectrum analyzer Models SA-70A or SA-71A which is effective from 500 KHz to 1,300 MHz.

A digital computer 14 is also mounted in the housing 12. The digital computer marketed by the Varian Company, and designated as their Model 620/f, is suitable for this purpose. Also included in the housing 12 is an appropriate 24K memory for the computer, designated 16 in FIG. 2. Other components are also mounted in the housing, including an appropriate power supply. A cathode-ray tube read-out unit 20 is also provided, and this unit may be of the type marketed by the Tektronix Company and designated by them as their model 4010. Also, an X-Y plotter 22 is provided for making a permanent record of the outputs from the apparatus. A control panel 25 for the entire system is shown in some detail in FIGS. 1 and 4. The various units of FIG. 1 are shown in block form in FIG. 2. Also included in the block diagram of FIG. 2 is a control and processing input module 24 which interfaces the spectrum analyzer 10 with the digital computer 14.

Figure 2:
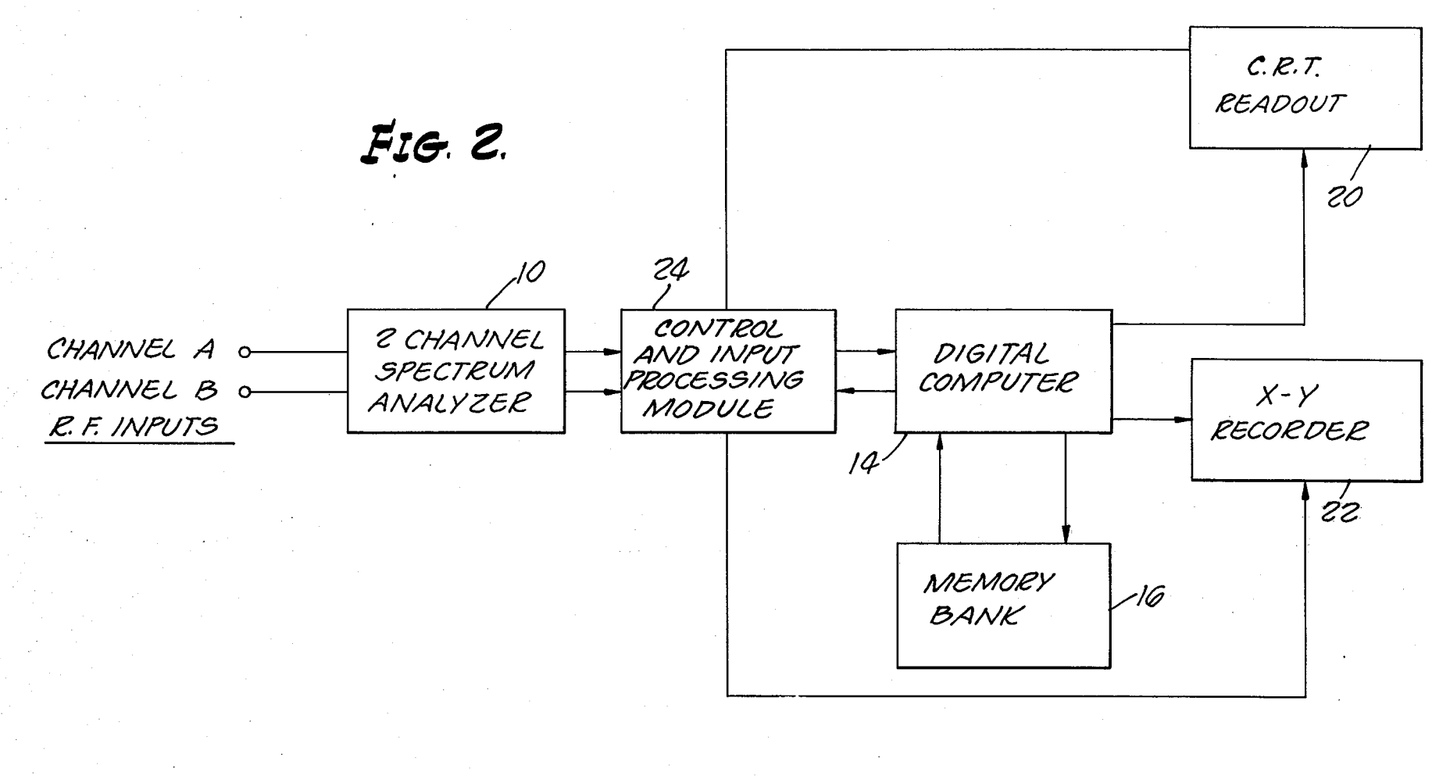
FIG. 2 is a generalized block diagram of a digital radio frequency Fourier analyzer embodying the invention.

Referring now to FIG. 2, the radio-frequency/intermediate frequency converter section of the analyzer may be considered as represented by the blocks 10 and 24. The function of this section is to convert the signals applied to channels A and B, which are in a frequency range of from 500 KHz to 1.3 GHz to a band-limited intermediate frequency signal centered, for example, on 2.7 MHz, which can be sampled digitally. A second function of the radio frequency section is to maintain the amplitude of the 2.7 MHz signal substantially at the maximum allowable input level to the analog/digital converter which is included in the processing module 24, in order to use effectively the full range of the digital system.

Figure 3:
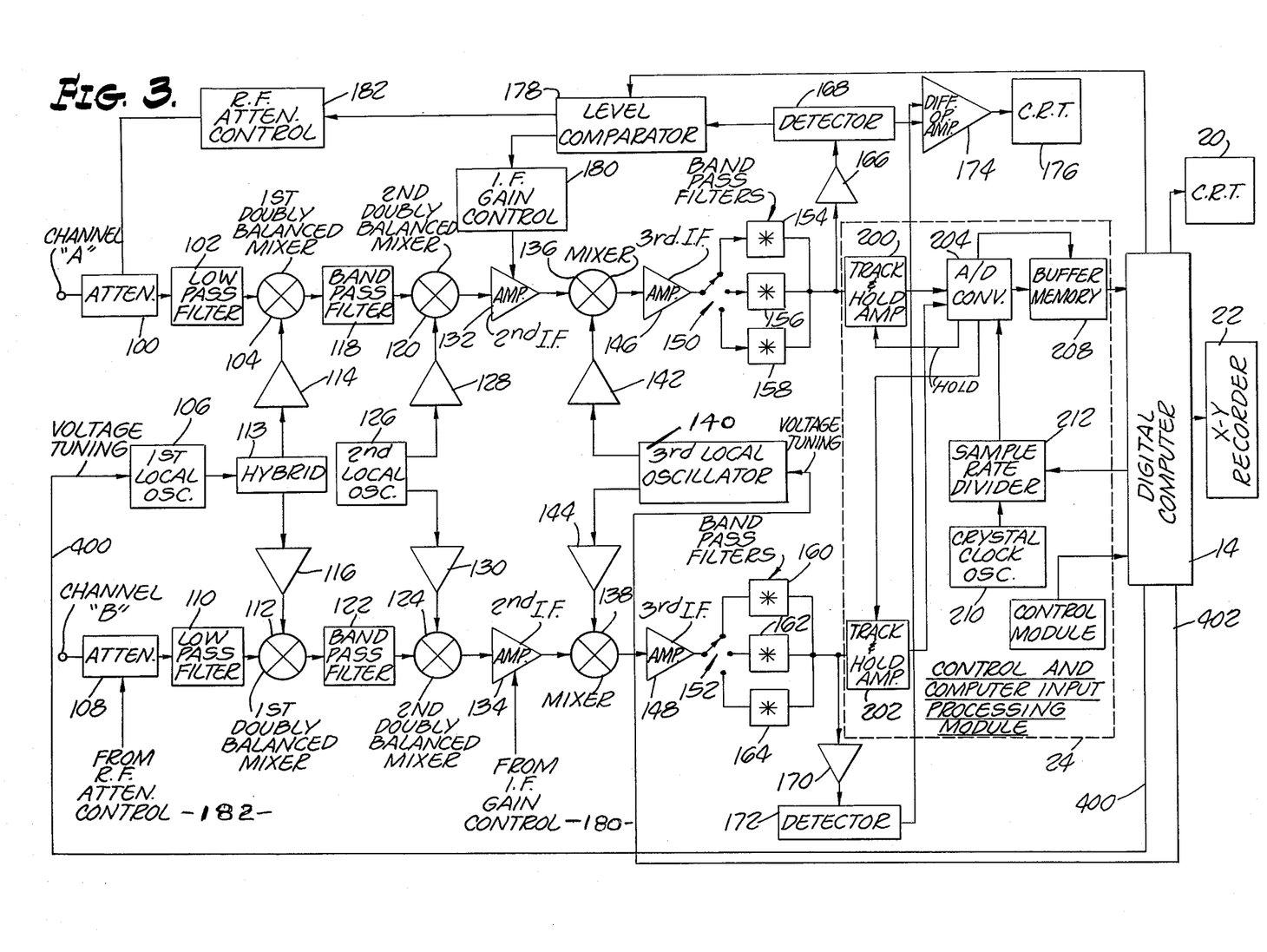
FIG. 3 is a more detailed block diagram of the system of FIG. 2.

As shown in the block diagram of FIG. 3, three stages of frequency conversion are used in the analog spectrum analyzer of the block 10. The analyzer comprises, for example, a controllable input attenuator 100 which introduces the 500 KHz to 1.3 GHz signal received over channel A to a low pass filter 102. The low pass filter passes only those signals below 1.3 GHz to a first heterodyne mixer 104. As indicated, the mixer 104 may be a doubly balanced mixer. Also included in the spectrum analyzer of block 10 is a first local oscillator 106. The first local oscillator is a voltage controlled oscillator which is scanned through the 1.5–2.8 GHz band in discrete increments by the digital computer 14.

The signal received over channel B which, likewise, is in the 500 KHz – 1.3 GHz band is attenuated by an attenuator 108, the output of which is passed through a low pass filter 110 to a doubly balanced first heterodyne mixer 112. The low pass filter 110 passes only those frequencies below 1.3 GHz. The output from the first local oscillator 106 is passed through a hybrid coupling network 113, and through amplifiers 114 and 116 to the mixers 104 and 112 respectively. In this way, heterodyne signals are applied to the mixers which are scanned through the 1.5 – 2.8 GHz frequency band in discrete steps.

The output from the mixer 104 is passed through a bandpass filter 118 to a second doubly balanced heterodyne mixer 120. The pass band of the filter 118 is of the order of 1.5 GHz. Likewise, the output of the first mixer 112 is passed through a similar bandpass filter 122 to a second doubly balanced mixer 124. A crystal controlled second local oscillator 126 produces a 1.44 GHz output signal which is introduced by amplifiers 128 and 130 to the respective mixers 120 and 124.

The mixers 120 and 124 produce respective intermediate frequency signals each having a center frequency of the order of 60 MHz. These latter signals are amplified in respective second intermediate frequency amplifiers 132 and 134. The signal from the amplifier 132 is introduced to a further heterodyne mixer 136, and the signal from the intermediate amplifier 134 is introduced to a further heterodyne mixer 138. A third local oscillator 140 is coupled to the mixers 136 and 138 through respective amplifiers 142 and 144. The oscillator 140 is voltage controlled by the computer 14, and is scanned by the computer through a 100 KHz band in 10 KHz steps.

The resulting outputs from the mixers 136 and 138 are passed through respective amplifiers 146 and 148 to resolution control switches 150 and 152. The switch 150 selectively connects three bandpass filters 154, 156 and 158 into the circuit between the amplifier 146 and a track and hold circuit 200 in the control and computer input processing module 24. The switch 152, on the other hand, selectively connects three bandpass filters 160, 162 and 164 between the amplifier 148 and a track and hold circuit 202 in the module 24. The bandpass filters 154, 156, 158 and 160, 162, 164 exhibit respective bandwidths of 1 MHz, 100 KHz and 10 KHz.

The output of the first group of bandpass filters is passed through a log/linear amplifier 166 to a detector 168; whereas the output of the second group of bandpass filters is also applied to a log/linear amplifier 170 connected to a detector 172. The outputs of the detectors 168 and 172 are connected through a differential operational amplifier 174 to a cathode-ray tube display device 176. The output from the detector 168 is also applied to a level comparator 178 which, in turn, is connected to an intermediate frequency gain control circuit 180 and to a radio frequency attenuation control circuit 182. The control circuit 180 controls the gain of the second intermediate frequency amplifiers 132 and 134, and the control 182 controls the setting of the attenuators 100 and 108. The level comparator 178 is also controlled by the computer 14.

The output of the track and hold circuit 200 in the module 24 is applied to an analog/digital converter 204, as is the output from the track and hold circuit 202. The output from the analog/digital converter is fed into a buffer memory 208 which may have a capacity, for example, of 2,048 words.

A crystal control clock oscillator 210 is also included in the module 24, the output of which is passed through a sample rate divider 212 controlled by the computer. A sample signal of the order of 3 MHz or higher (depending upon which bandpass filters 154, 156, 158, 160, 162, 164 have been selected) is applied to the analog/digital converter 204 from the divider 212. The module 24 also includes a control module for the digital computer.

The resulting signal applied to the track and hold circuit by the first group of bandpass filters, and the resulting signal applied to the track and hold circuit 202 by the second group of bandpass filters, has a center frequency of 2.7 MHz. As stated above, the function of the radio frequency section is to convert the incoming signals in channels A and B, which are in a frequency range of from 500 KHz to 1.3 GHz to the 2.7 MHz intermediate frequency signal which is appropriately band limited, as determined by the selected bandwidth filter of the first or second groups. As also pointed out, a secondary function of the radio frequency section is to maintain the amplitude of the 2.7 MHz signal at the maximum allowable input level to the analog/digital converter 204 in order to use effectively the full range of the digital system.

As described above, three stages of frequency conversion are used in each channel in the radio frequency section, with the first and third local oscillators of each channel being tunable by the computer in discrete steps. These oscillators may be phase locked against crystal references to achieve frequency accuracy and stability of the order of one part in $10^6$ or better. The frequency of the first local oscillator 106 is controllable in increments of 1 MHz, and the frequency of the third local oscillator 140 is controllable in increments of 10

KHz and 100 KHz. Tuning of the local oscillators is accomplished by the computer in accordance with a predetermined program and through digital/analog converters.

The dynamic range of the analog/digital converter 204 and the digital system in a constructed embodiment has been measured at 69 dB. In order to utilize this range effectively, the peak input signal should be maintained constant at the maximum level of the analog/digital converter. This function is accomplished by the automatic gain control circuits formed by the components 166, 168, 170, 172, 178, 180 and 182. The AGC scale factors are also stored in the computer so that absolute level signals may be determined allowing absolute read-out within the accuracy of the radio frequency system, that is with ± 1 dB.

The band limiting filters 154, 156, 158 and 160, 162, 164 confine the signal being sampled to a predetermined bandwidth. These filters provide nominal analysis bandwidths of 1 MHz, 100 KHz and 10 KHz corresponding to frequency resolutions from the Fourier transform of 1,000, 100 and 10 Hz respectively. The two-channel radio frequency/intermediate frequency converter section can be operated manually, but it requires the digital computer 14 to provide the commands for the gain settings, the sweeping of the first and third local oscillators 106 and 140, selected by the "center frequency" and "scan width" controls on the control module front panel, and possibly the read-out.

Figure 4:
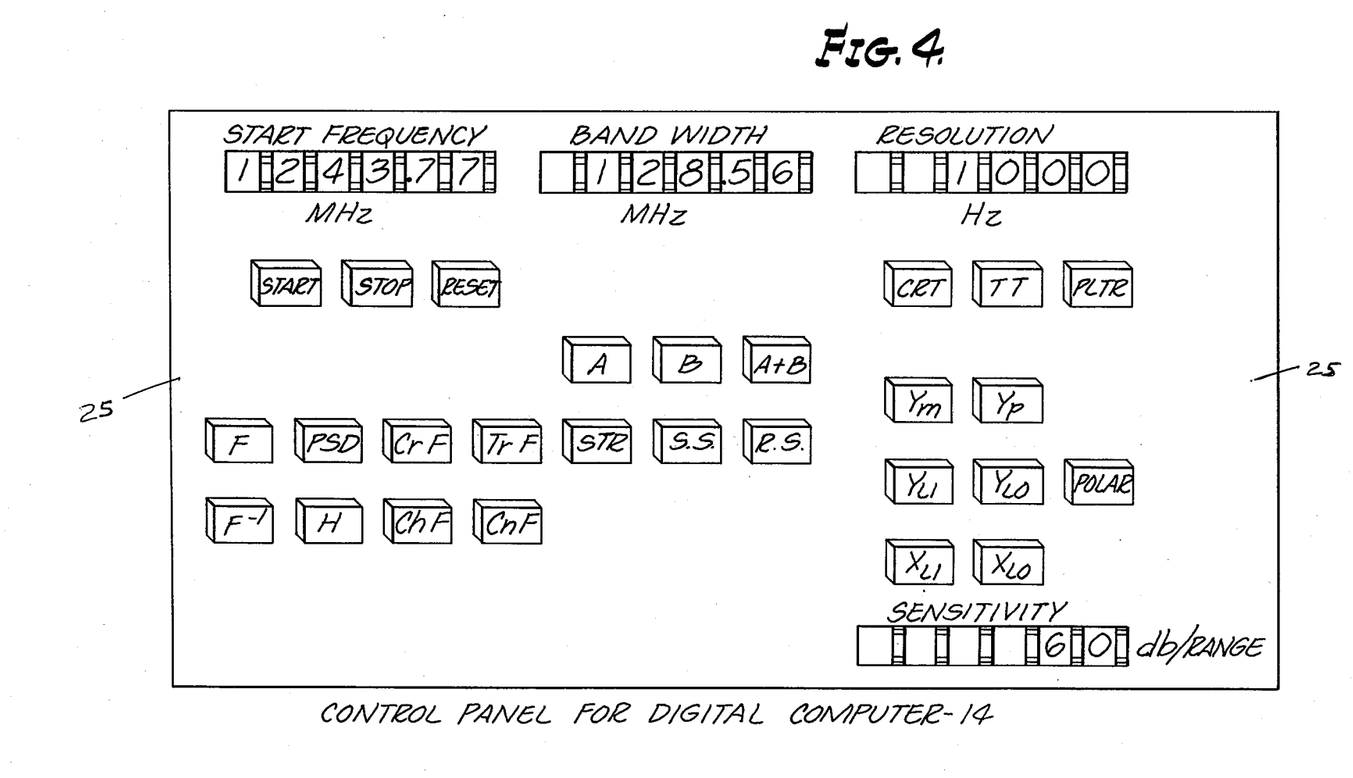
FIG. 4 is a diagram of a control panel which may be utilized in the analyzer of the invention.

An appropriate control panel for the system is shown in FIG. 4. The control panel includes three sets of thumbwheel switches by which the "Start Frequency", the "Band Width" and the "Resolution" desired for any particular analysis may be programmed into the computer.

The control panel also includes a set of three pushbutton switches labelled "Start," "Stop" and "Reset" for starting, stopping and resetting the system.

A pushbutton switch "F" instructs the system to calculate the Fourier transforms, and a pushbutton switch "F$^{-1}$" instructs the system to calculate the inverse Fourier transforms. The "PSD" switch tells the system to calculate the power spectral density, and the switch "H" tells the system to calculate the histogram of a particular function. The switches $C_rF$, $T_rF$, $C_hF$ and $C_nF$ refer to the various functions, i.e., correlation, transfer, coherence and convolution.

The channels A and B of the system may be individually selected, or both channels may be used by selective actuation of the pushbutton switches "A," "B" or "A + B." An appropriate output device such as the cathode-ray tube 20, the plotter 22, or a teletype printer, may be selected by operation of the switches "CRT," "PLTR" or "TT." A set of thumbwheel switches is provided to permit an appropriate sensitivity setting for the system to be made.

The system may be set to select its input from storage, if desired, by actuating the pushbutton "STR;" also single scan operation, or repeat scan operation may be selected by actuating the pushbuttons "S.S." or "R.S."

The pushbuttons "$Y_M$," "$Y_P$," "$Y_{L1}$," "$Y_{L0}$," "$X_{L1}$," "$X_{L0}$," and "POLAR," determine the mode of operation of the system or select that the X and Y outputs be displayed in magnitude, phase, on a linear scale, on a logarithmic scale, or in polar coordinates.

The radio frequency/intermediate frequency converter section can be used for analog operation. This is achieved by the logarithm/linear amplifiers 166 and 170, the linear detectors 168 and 172, the video differential amplifier 174, and the cathode-ray tube display 176. For spectrum analysis, the cathode-ray tube 176 will display the spectrum with the radio frequency/intermediate frequency converter section used as a single channel spectrum and analyzer. The display can be either linear or logarithmic.

For network analysis, the radio frequency/intermediate frequency converter section operates as a two-channel receiver similar to a vector voltmeter, except that the local oscillators are not phase locked to the incoming signal. The frequency to which the analyzer is tuned is set by the "center frequency" dial on the control module front panel. The detected direct-current outputs from the two final detectors 168 and 172 are combined in the differential operational amplifier 174 to display the difference between the two direct-current signals. In the logarithmic mode this provides a difference in radio frequency input levels expressed linearly in dB, taking into account the difference in gain of the two channels as indicated by the "full scale" setting of the two gain controls.

The digital section of the system includes the digital computer 14, as well as the control and computer input processing module 24. The analog/digital converter 204 is included in the module, as described above. The analog/digital converter in a constructed embodiment is a ten bit two's complement converter with front end track and hold amplifiers 200 and 202 capable of sampling the 2.7 MHz input signal from each channel. To accomplish this, an aperture time on each track and hold amplifier of 60 picoseconds is required. Depending upon the intermediate frequency bandwidth in use, the sampling rate of the analog/digital converter will be 3.5 MHz, 350 KHz or 35 KHz. The high speed buffer memory 208 is required between the analog/digital converter and the digital computer 14 to provide temporary storage at the higher sampling rate. The sampling signals are generated by dividing down the clock signal derived from the crystal clock oscillator 210 through the sample rate divider 212. Three sampling rates are selectable corresponding to the three band limiting filter bandwidths.

The digital computer 14 used in a constructed embodiment is a Varian data machine Model 620/$f$ with a minimum of 8K words of core memory. To provide the maximum flexibility and utilization of the system, additional core memory may be required. The computer calculates the fast Fourier transform (FFT) of the sampled data and, depending upon the application, uses the results of the FFT to calculate one or more derived functions such as power spectrum, cross spectrum, transfer function, and the like. The results are either stored in the memory for later use, such as in long term averaging, or are fed to one or the other of the output devices 20 and 22.

The computer 14 also serves as a control for the radio frequency/intermediate frequency converter section. Operating under program control, the computer generates tuning information for the frequency synthesized local oscillators 106 and 140, this information being transmitted to the local oscillators over the respectively leads 400 and 402 in FIG. 3. The computer also adjusts the radio frequency attenuators 100 and 108 and the intermediate frequency amplifiers 132 and 134 by introducing a control to the level comparator 178, so as to obtain an optimum signal level to the analog/digital converter 204 at all times.

The cathode-ray tube 20 may be a full graphic/alphanumeric terminal similar to the Tektronix Model 4010, as mentioned above. The display is used to present large screen, formatted displays of the spectral data and derived functions. The terminal will have the capability to display appropriate scales, captions and other identifying information with the data display.

The X-Y plotter 22 serves as the basic hard copy output device. This plotter may be a standard graphic plotter or recorder with a digital/analog converter.

The invention provides, therefore, a radio frequency digital Fourier analyzer which comprises the combination of a programmable radio frequency/intermediate frequency converter and a digital computer, together with certain appropriate interface components, as described above. The resulting combination results in a digital spectrum analyzer with very high resolution and, at the same time, wide dispersion, covering the frequency range of the prior art analog spectrum analyzer. Specifically, the digital analyzer of the invention is capable of operation in the range of 500 KHz to 1,300 MHz.

The resulting digital analyzer has inherent advantages over the prior art analog spectrum analyzer in that high resolution may be achieved without increase in scanning time as long as the signal-to-noise ratio in the intermediate frequency output is high. Also, the resolution of the spectrum analysis can be changed in the digital system by simply changing the program, and no hardwave change is involved.

The spectral information computed by the digital analyzer of the invention may be stored and made available for processing such as determining the cross-correlation function, power spectra, statistic, interrogation, time transfer function, and the like, similar to the applications which are available to users of the prior art digital Fourier analyzers, but which are capable of operation only at the lower frequencies.

Using the concept of the present invention, by which the digital analyzer is capable of operation at the higher frequencies, it is capable of more widespread use for automatic network analysis. It can also be used as a transient recorder for very high frequency transients on carriers. By averaging many samples, signals buried in noise can be detected by the system of the present invention.

It will be appreciated that although a particular embodiment of the invention has been described, modifications may be made. It is intended in the following claims to cover the modifications which come within the spirit and scope of the invention.

What is claimed is:

1. A radio frequency digital Fourier analyzer system comprising: a pair of input circuits for receiving a pair of separate signals each lying in a predetermined radio frequency range; a radio frequency/intermediate frequency converter circuit coupled to each of said pair of input circuits and responsive to said radio frequency signals to produce intermediate frequency output signals of a particular intermediate frequency and bandwidth; an analog/digital converter coupled to the outputs of said radio frequency/intermediate frequency converter circuits for transforming each intermediate frequency output signal into a corresponding digital signal; digital computer means coupled to said analog/digital converter and responsive to the digital signal therefrom for performing computations corresponding to selected Fourier transforms; and readout means coupled to said digital computer means for utilizing output information from the computer means corresponding to the aforesaid computations.

2. The radio frequency digital Fourier analyzer defined in claim 1, in which each of said radio frequency/intermediate frequency converter circuits includes at least one mixer coupled to a variable frequency local oscillator for heterodyning a received radio frequency signal to a selected intermediate frequency said local oscillator being coupled to permit said computer means to control the frequency of said local oscillator in discrete steps through a predetermined frequency range.

3. The radio frequency digital Fourier analyzer defined in claim 1, in which each of said radio frequency/intermediate frequency converter circuits includes an automatic gain control circuit responsive to the output signal level of one of said converter circuits and to said digital computer means for maintaining a predetermined amplitude of the intermediate frequency output signals of each of said converter circuits at a maximum value with respect to the requirements of said analog/digital converter.

4. The radio frequency digital Fourier analyzer system defined in claim 1, in which each of said radio frequency/intermediate frequency converter circuits includes a plurality of bandpass filters, and further includes switching means connected to said plurality for selectively coupling one of said plurality in series with the output of said converter circuit, so as to establish different bandwidths of said intermediate frequency output signal.

* * * * *